United States Patent [19]

Bennison

[11] Patent Number: 5,044,868
[45] Date of Patent: Sep. 3, 1991

[54] VALVE SYSTEM FOR CONTROLLING A VACUUM LIFTING APPARATUS

[75] Inventor: Stewart Bennison, Sheepbridge, England

[73] Assignee: Palamatic Handling Systems Ltd, Chesterfield, England

[21] Appl. No.: 447,890

[22] Filed: Dec. 8, 1989

[30] Foreign Application Priority Data

Dec. 10, 1988 [GB] United Kingdom ................ 8828914

[51] Int. Cl.$^5$ ............................ B66C 1/02; G25J 11/00
[52] U.S. Cl. ...................................... 414/627; 901/40; 294/64.1
[58] Field of Search ........................ 414/627; 294/64.1; 901/40

[56] References Cited

U.S. PATENT DOCUMENTS

| | | | |
|---|---|---|---|
| 3,558,171 | 1/1971 | Netsch et al. | 294/64.1 |
| 3,578,372 | 5/1971 | Schuler . | |
| 3,743,340 | 7/1973 | Williamann . | |
| 3,834,558 | 9/1974 | Bru | 414/627 |
| 4,078,671 | 3/1978 | Lundstöm | 414/627 |
| 4,412,775 | 11/1983 | Molitor et al. | 414/627 X |
| 4,413,853 | 11/1983 | Andersson | 414/627 X |
| 4,557,514 | 12/1985 | Cushman et al. | 294/64.1 |
| 4,651,396 | 3/1987 | Kerlidou | 294/64.1 X |
| 4,763,941 | 8/1988 | Sniderman | 414/627 X |
| 4,854,627 | 8/1989 | Ericsson | 294/64.1 |
| 4,869,489 | 9/1989 | Wirz et al. | 294/64.1 X |

FOREIGN PATENT DOCUMENTS

| | | | |
|---|---|---|---|
| 2007167 | 1/1970 | France . | |
| 61-01845 | 1/1986 | Japan | 901/40 |
| 526461 | 8/1972 | Switzerland . | |
| 1180510 | 2/1970 | United Kingdom | 294/64.1 |
| 2200615 | 8/1988 | United Kingdom | 294/64.1 |

Primary Examiner—Robert J. Spar
Assistant Examiner—Robert S. Katz
Attorney, Agent, or Firm—Trexler, Bushnell, Giangiorgi & Blackstone, Ltd.

[57] ABSTRACT

A system for controlling vacuum lifting apparatus 2 comprising a bellows like lift tube 3 having an interior 6 connectable to a vacuum pump, with a suction foot 10 associated with the lift tube 4. Valve 1, serving to connect the interior 6 at a controllable level to atmosphere to regulate the internal vacuum and hence the axial extension of the lift tube 3, comprises a housing 11 having a first connection 12 to the suction foot 10 in airflow communication with a first chamber 13 of the housing 11, which chamber 13 has an outlet 14 to atmosphere controlled by a first valve member 15. A second connector 18 is in air flow communication to the vacuum pump via the lift tube 3, and air flow along the second connection 18 is controlled by a second valve member 20, whereby, in a load gripping and lifting mode, the first valve member 15 is partially open and the second valve member 20 is fully open; and in a load-releasing mode where the first valve member 15 is further or fully opened to admit air to the suction foot 10 and simultaneously, or shortly thereafter, the second valve member 20 is closed, or partialy closed, producing a higher vacuum in the interior 6.

7 Claims, 3 Drawing Sheets

VALVE SYSTEM FOR CONTROLLING A VACUUM LIFTING APPARATUS

This invention relates to valve means for controlling a vacuum lifting apparatus of the general type described in GB 2080764B.

Whilst this known apparatus has been used for lifting all manner of objects its use has always been limited to lifting from directly above the load, as the lift tube is a flexible bellows which cannot accommodate side loading. Hence it has been impossible to offer a solution to lifting loads from a lateral location e.g., from inside a machine press or from under pallet racking or shelving or from inside a machine guard. Also it has become increasingly apparent that, when handling large boards and planks, unless the load is picked up exactly on centre-line it will not remain horizontal and, in un-trained hands, can be somewhat unnerving in operation.

This problem is solved by the "rigid" tube vacuum lifting apparatus described and claimed in our co-pending pat. application Ser. No. 447,714, filed Dec. 8, 1989, and entitled "VACUUM LIFTING APPARATUS", corresponding to (GB priority Application 8828914.5).

The valve means of GB 2080764B, where the apparatus incorporates a load-engaging suction foot, merely controls the level of vacuum within the lift tube (by controlled bleeding of atmospheric air into the lift tube), and when the user wishes to release the suction foot from a load from the suction foot it is necessary to push a control lever fully down and at the same time crack open the elastomeric seal of the suction foot on the load, by the user twisting or lifting the suction foot. When the control lever is then released the lift tube will hover at a pre-determined height due to two settings, one on the lever and one on a balance plate valve between the suction foot and the lift tube.

However, with a "rigid" tube described and claimed in our aforementioned, co-pending pat. application Ser. No. 447,714 (GB priority Application 8820914.5) it is not possible to twist the suction foot to break the seal, and the valve means in accordance with the present invention is particularly useful for controlling such a "rigid" tube.

According to the present invention there is provided valve means for controlling vacuum lifting apparatus comprising a lift tube which is extendable and retractable in length, and is adapted to be located in an upright disposition with an upper end connectable to a fixed or movable anchorage point, the lift tube interior being connectable to a vacuum generating means and each end of the tube provided with air sealing means, a suction foot associated with the other end of the lift tube, and valve means, to connect the interior of the lift tube at a controllable level to atmosphere to regulate the vacuum therein and hence the axial extension of the lift tube, comprising a housing having a first connection to the suction foot in air-flow communication with a chamber of the housing, which chamber has an outlet to atmosphere controlled by a first valve member, a second connector in air flow communication to a source of vacuum via the lift tube, with the air flow along the second connector controlled by a second valve member, whereby, in a load gripping and lifting mode, the first valve member is partically open to regulate the vacuum level within the interior of the associated lift tube and hence the height to which the load is lifted, and the second valve member is fully open, while in a load-releasing mode the first valve member is further or fully opened, to admit air to the suction foot thereby releasing the grip of the suction foot on the load and simultaneously, or shortly thereafter, the second valve member is closed, or partially closed, producing a higher vacuum within the interior of the lift tube, to retract the axial length thereof to lift the suction foot away from the previously released load.

If the valve means, and associated lifting apparatus are intended for manual use, then the first and second valve members are manually-operable. However, the rigidization of the lift tube in accordance with our co-pending patent application previusly referred to, renders that apparatus suitable for automated operation, and consequently operation of the first and second valve members may be motorised, irrespective of the nature of any associated lifting apparatus.

Previously, both the first and second valve members are mounted on a common operating spindle and hence the outlets are co-axial. Displacement of the valve members is conveniently by a manually-operable lever pivotally attached to the valve housing, in which case, the first valve member is pivotally attached to the spindle.

Alternatively the second valve member may be a butterfly valve, within the second connector, to control air flow along the second connector. The butterfly valve may be manually actuable e.g., by a mechanical linkage to the "U"-shaped lever.

The invention will now be described in greater detail, by way of example, with reference to the accompanying drawings, in which:

FIG. 1 is a diagrammatic sectional plan view of a valve means on the line I—I of FIG. 2, FIG. 2 is a section on the line II—II of FIG. 1, showing the operating lever/handle in a first, gripping and lifting position;

FIG. 3 corresponds to FIG. 2 but shows the operating lever/handle in a second, release position, FIG. 4 illustrates the valve means of FIGS. 1 to 3 applied to a vacuum lifting apparatus.

Figure 4:
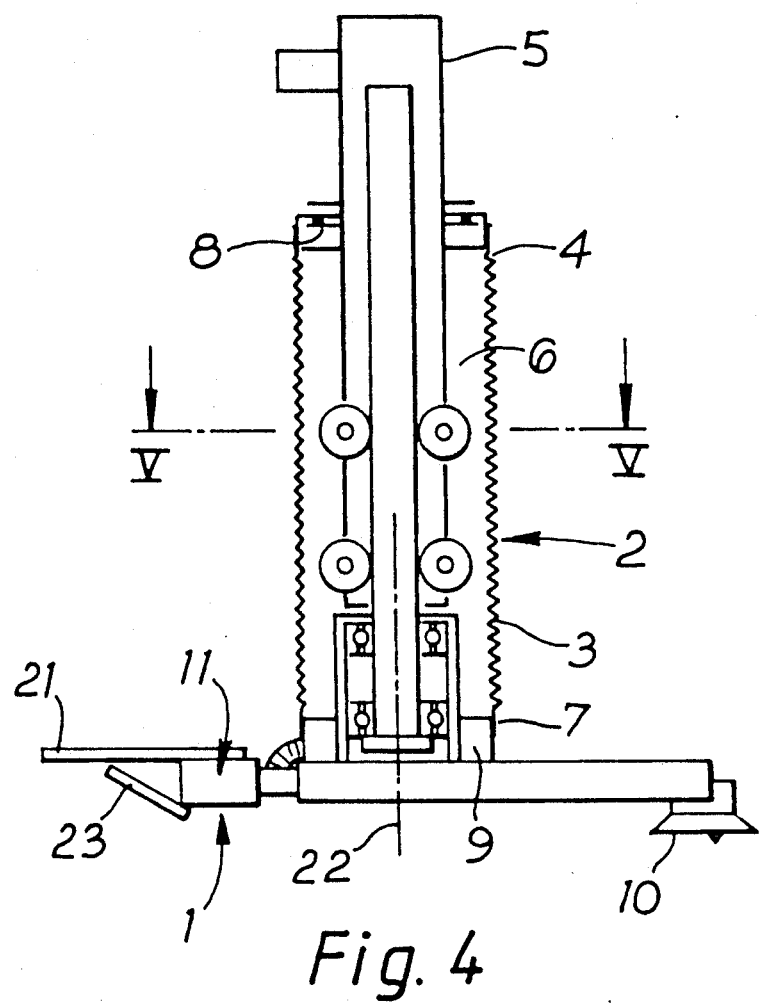
Figure 5:
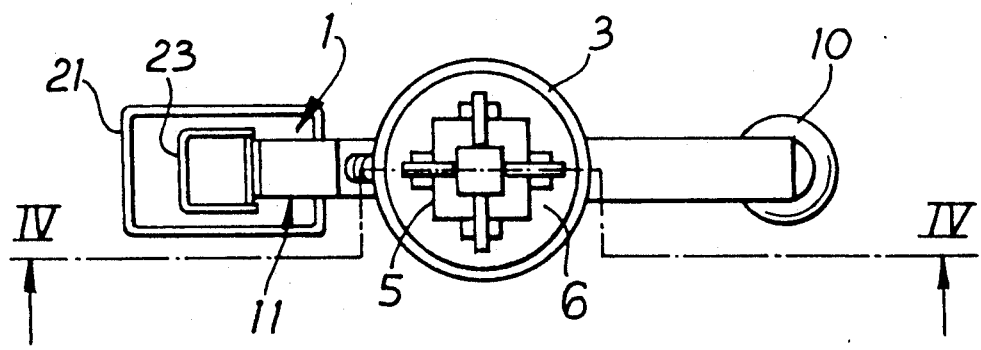
FIG. 5 is a sectional view along a plane indicated by line V—V in FIG. 4.
Figure 6:
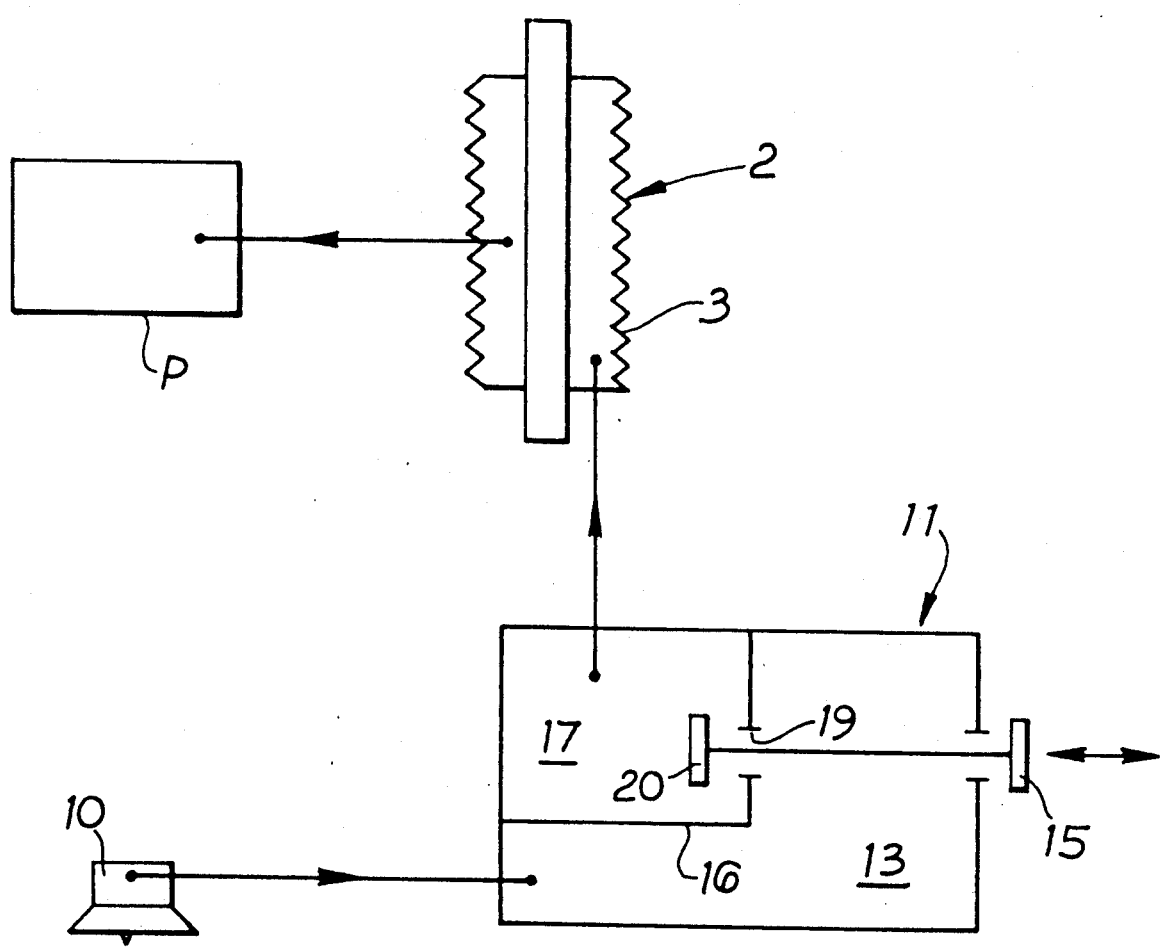
FIG. 6 shows the valve means of FIG. 1 to 3 and the vacuum lifting apparatus of FIGS. 4 and 5 connected to a vacuum source.

In the drawings, valve means 1 for controlling vacuum lifting apparatus 2 (illustrated in FIG. 4), which apparatus 2 can be seen to comprise a bellows-like lift tube 3 which is extendable and retractable in length, and is adapted to be located in an upright position with an upper end 4 connectable to a fixed or movable anchorage point 5. An interior 6 of the lift tube is connectable to a vacuum generating means in the form of a vacuum pump P (FIG. 6) and each end 4, 7 of the tube 3 is provided with air sealing means 8, 9, while a suction foot 10 is associated with the other end 7 of the lift tube 3. The valve means 1 serves to connect the interior 6 of the lift tube 3 at a controllable level to atmosphere to regulate the vacuum therein and hence the axial extension of the lift tube 3. The valve means 1 in accordance with the invention comprises a housing 11 having a first connection 12 to the suction foot 10 in air-flow communication with a first chamber 13 of the housing 11, which chamber 13 has an outlet 14 to atmosphere controlled by a first valve member 15. Wall means 16 within the housing 11 defines a second chamber 17. A second connector 18 is in air flow communication to a source of vacuum via the lift tube 3, and an outlet 19 in the wall means 16 between the first and second chambers 13 17, is controlled by a second valve member 20.

The valve means 1 is particularly adapted for manual operation, comprising a square "U"-shaped hand grip 21 attached to the housing 11, for manoeuvring the lifting apparatus 2, particularly by rotation about the longitudinal axis 22 of the lift tube 3. A similar, square "U"-shaped lever 23 located within the hand grip 21 pivotally attached to the housing 10 on axis 24, with a pawl 25 carried by the lever 23 and operable on he first valve member 15. The first and second valve members, 15, 20 are mounted on a common operating spindle 26 and hence their associated outlets are co-axial, the first valve member 14 being pivotally attached to the end of the spindle 26 about axis 27, while the second valve member 20 is displaceable along the spindle 26 between stops 29, being urged towards one stop by a coil compression spring 28.

Figure 1:
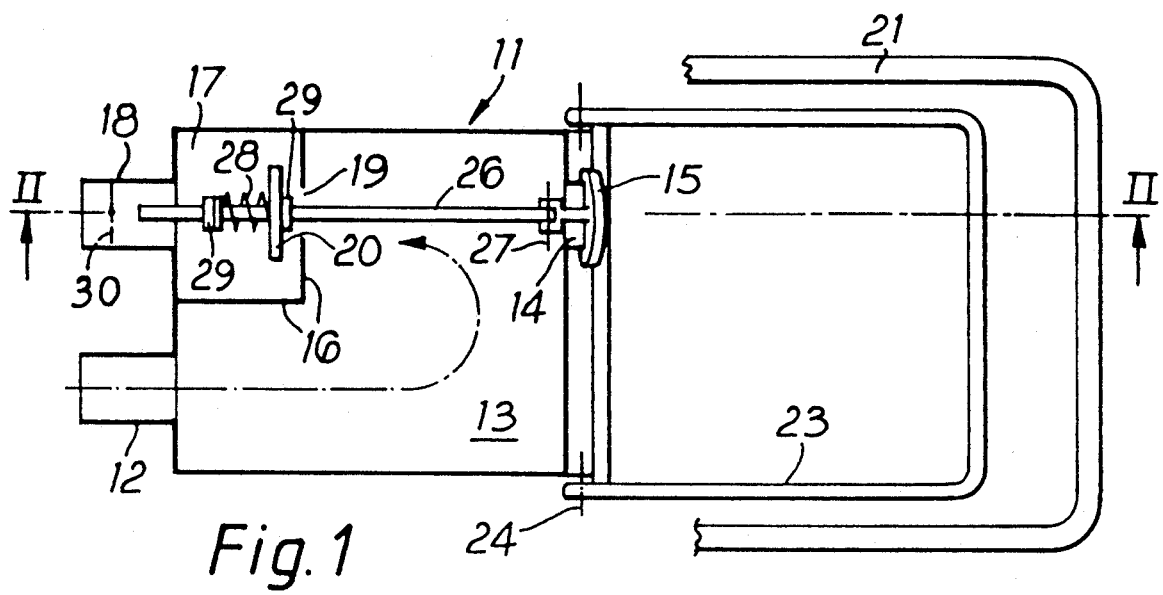
Figure 2:
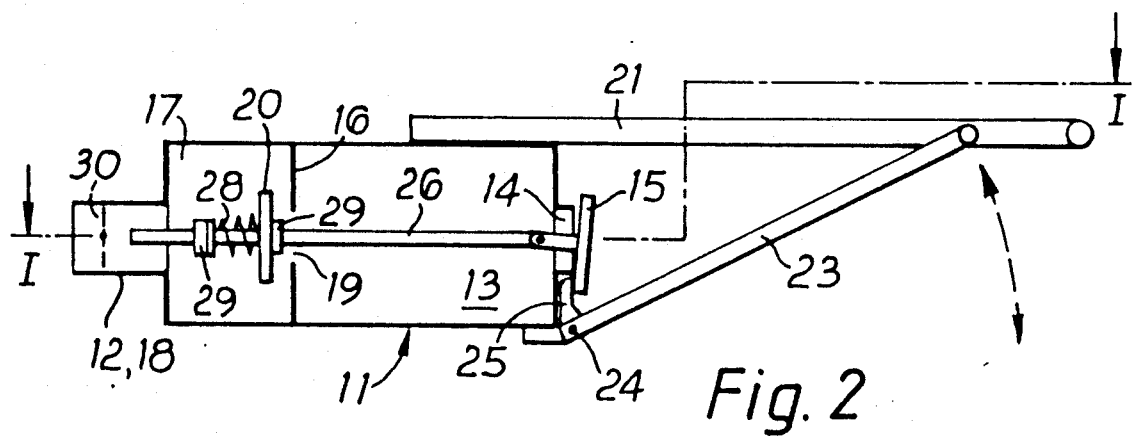
Figure 3:
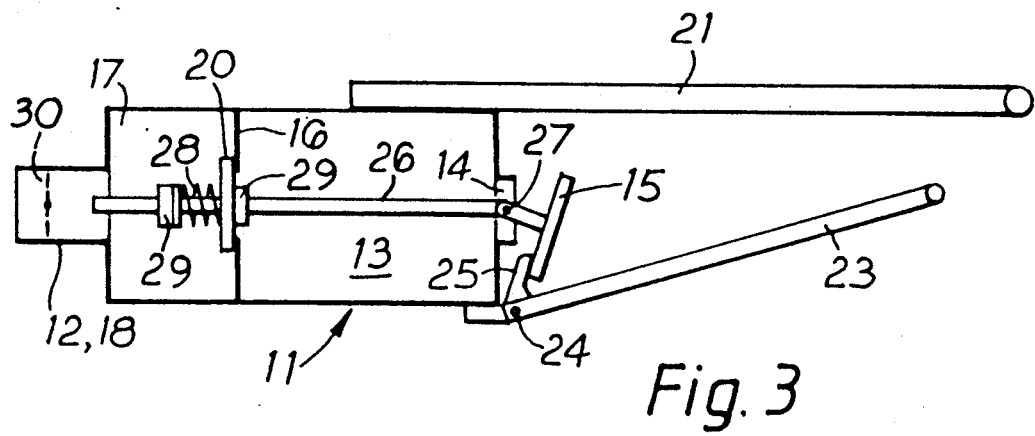

In a load gripping and lifting mode, the first valve member 15 is partially open, as indicated in FIGS. 1 and 2, to regulate the vacuum level with the interior 6 of the associated lift tube 4, and hence the axial extension or retraction of the lift tube 3 and consequently of the suction foot 10 and any load carried by the suction foot 10, while the second valve member 20 is fully open, also as indicated in FIGS. 1 and 2. In a load-releasing mode, the first valve member 15 is further or fully opened, to attain the position shown in FIG. 3, to admit air to the suction foot 10 via the first connection 12, thereby releasing the grip of the suction foot 10 on the load and simultaneously, or shortly thereafter, the second valve member 20 is closed, or partially closed, producing a higher vacuum in the interior 6 of lift tube 3 to retract the axial length thereof to lift the suction foot 10 from the previously released load.

What I claim is:

1. A system for controlling vacuum lifting apparatus comprising a lift tube which is extendable and retractable in length, and is adapted to be located in an upright position with an upper end of said lift tube being connectable to an anchorage, an interior of said lift tube being connectable to a vacuum generating means air sealing means provided at each end of said tube, a suction foot associated with the lower end of said lift tube, and valve means, to connect said interior of said lift tube at a controllable level to atmosphere to regulate the vacuum therein and hence the axial extension of said lift tube, comprising a housing, a first connection carried by said housing, a chamber provided by said housing, said first connection being connectable to said suction foot and in air-flow communication with said chamber an outlet of said chamber connectable to atmosphere, a first valve member to control connection to atmosphere of said outlet, a second connector in air flow communication to said vacuum generating means via the lift tube, a second valve member to control air flow along said second connector whereby, in a load gripping and lifting mode, the first valve member is partially open to regulate the vacuum level within the interior of associated lift tube and hence the height to which the load is lifted, and the second valve member is fully open, while in a load-releasing mode the first valve member is further or fully opened to admit air to the suction foot thereby releasing the grip of the suction foot on the load and simultaneously, or shortly thereafter, the second valve member is closed, or partially closed, producing a higher vacuum within the interior of the lift tube, to retract the axial length thereof to lift the suction foot away from the previously released load.

2. A system for controlling vacuum lifting apparatus as claimed in claim 1, wherein the valve means further comprises manually operable means for said first and second valve members.

3. A system for controlling vacuum lifting apparatus as claimed in claim 1, wherein the valve means further comprises a common operating spindle which carries said first and second valve members and hence said outlets of said first and second valve members are co-axial.

4. A system for controlling vacuum lifting apparatus as claimed in claim 3, wherein the valve means further comprises a manually-operable lever pivotally attached to said valve housing, with said first vale member pivotally attached to said spindle.

5. A system for controlling vacuum lifting apparatus as claimed in claim 1, wherein the valve means further comprises wall means within said chamber to define a second chamber, an outlet in said wall means between said chamber and said second chamber being controllable by said second valve member.

6. A system for controlling vacuum lifting apparatus as claimed in claim 1, wherein the valve means further comprises a butterfly valve within said second connector, which butterfly valve constitutes said second valve members.

7. A system for controlling vacuum lifting apparatus as claimed in claim 1, in combination with vacuum lifting apparatus comprising a lift tube which is extendable and retractable in length, is adapted to be located in an upright disposition with an upper end connectable to an anchorage, and an interior of said lift tube being connectable to said vacuum generating means, with each end of said lift tube being provided with air sealing means.

* * * * *